United States Patent
Kobayashi et al.

(10) Patent No.: US 10,719,082 B2
(45) Date of Patent: Jul. 21, 2020

(54) GUIDEPATH OF CARRIER VEHICLE

(71) Applicant: HONDA MOTOR CO., LTD., Tokyo (JP)

(72) Inventors: Takuo Kobayashi, Tochigi (JP);
Takuya Furuno, Tochigi (JP); Yoshito Otake, Tochigi (JP); Masafumi Goto, Tochigi (JP); Keisuke Oya, Tochigi (JP); Tetsuro Yamanobe, Tochigi (JP); Nobuhiro Nanba, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/412,964

(22) Filed: May 15, 2019

(65) Prior Publication Data

US 2019/0361461 A1    Nov. 28, 2019

(30) Foreign Application Priority Data

May 22, 2018    (JP) .................................. 2018-097694

(51) Int. Cl.
*G05D 1/02*    (2020.01)
*B62D 1/26*    (2006.01)
*B62D 1/28*    (2006.01)

(52) U.S. Cl.
CPC ........... *G05D 1/0263* (2013.01); *B62D 1/265* (2013.01); *B62D 1/283* (2013.01); *G05D 1/0229* (2013.01); *G05D 2201/02* (2013.01)

(58) Field of Classification Search
CPC .. G05D 1/0023; G05D 1/0263; G05D 1/0229; B62D 1/265

See application file for complete search history.

(56) References Cited

U.S. PATENT DOCUMENTS

| | | | | |
|---|---|---|---|---|
| 5,972,092 A | * | 10/1999 | Cordova | C08L 99/00 106/126.3 |
| 7,991,521 B2 | * | 8/2011 | Stewart | G01C 21/00 180/170 |
| 8,768,559 B1 | * | 7/2014 | Murphy | G05D 1/0236 250/221 |
| 9,405,294 B2 | * | 8/2016 | Jagenstedt | A01D 34/008 |
| 2014/0067184 A1 | * | 3/2014 | Murphy | G05D 1/0265 701/23 |
| 2014/0172223 A1 | * | 6/2014 | Murphy | G05D 1/0289 701/25 |

(Continued)

FOREIGN PATENT DOCUMENTS

| | | |
|---|---|---|
| JP | 08-04426 | 2/1996 |
| JP | 11-119828 | 4/1999 |

*Primary Examiner* — John D Walters
*Assistant Examiner* — James J Triggs
(74) *Attorney, Agent, or Firm* — Rankin, Hill & Clark LLP

(57) ABSTRACT

The guidepath includes: a magnet guide tape which carries S pole, and guides a carrier vehicle in a first direction by the S pole by being arranged on a floor so as to extend in the first direction; a magnet guide tape which carries S pole, and guides the carrier vehicle in a second direction by the S pole by being arranged on the floor so as to extend in a second direction which intersects the first direction; and a magnetic body tape which is arranged at a side of the magnet guide tape at a position above which a marker sensor passes upon the carrier vehicle being guided by the magnet guide tape, and suppresses N pole.

8 Claims, 5 Drawing Sheets

(56) References Cited

U.S. PATENT DOCUMENTS

2018/0024554 A1\* 1/2018 Brady ................. G06T 7/20
                                                701/23
2018/0029797 A1\* 2/2018 Hance ................ B65G 1/1373

\* cited by examiner

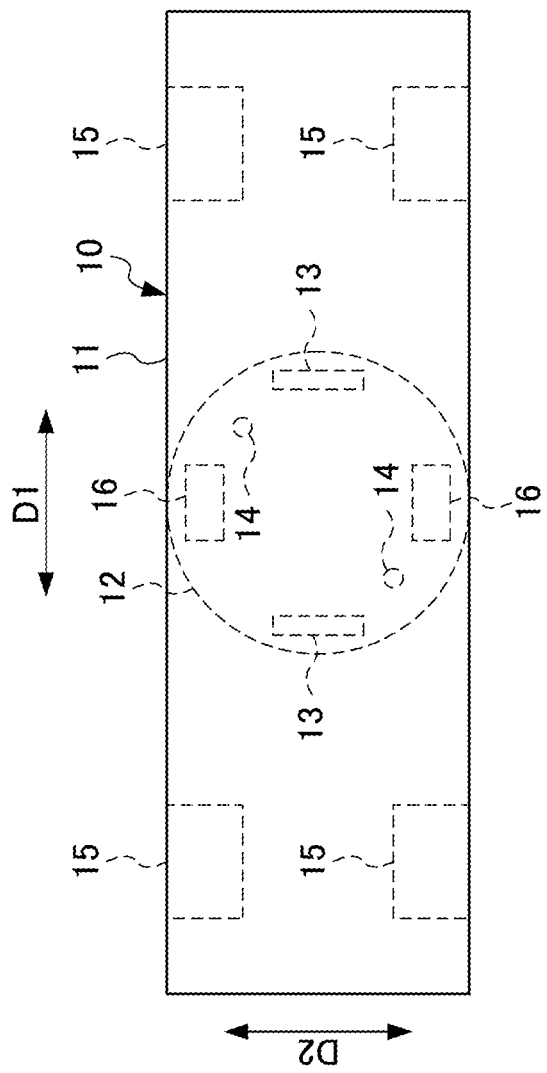

GUIDEPATH OF CARRIER VEHICLE

This application is based on and claims the benefit of priority from Japanese Patent Application No. 2018-097694, filed on 22 May 2018, the content of which is incorporated herein by reference.

BACKGROUND OF THE INVENTION

Field of the Invention

The present invention relates to a guidepath of a carrier vehicle.

Related Art

Conventionally, technology for line trace control of a carrier vehicle using a belt-shaped magnetic body has been known. As documents disclosing this type of technology, there are Patent Documents 1 and 2.

Patent Document 1 describes, with regards to a branching system of an unmanned vehicle which lays a belt-like magnetic body on a route to travel and carries out travel control by detecting this belt-like magnetic body, the matter of defining i and j as positive integers of 2 or more, respectively, installing first to $j^{th}$ belt-like magnetic bodies laid along first to $i^{th}$ branching pathways which branch i number of ways, making left/right branching pathways into a sequential group from the outside, and making the same within the group; and a sensor unit which identifies magnetism of the first to $j^{th}$ belt-like magnetic bodies, and excluding the case when going straight ahead, in the case of branching to any of the branching paths, or merging from any of the branching paths, the sensor unit detects an inside end of the belt-like magnetic body guiding the branching path and performs travel control.

Patent Document 2 describes a magnetic guide body mounting structure of a magnetic guide-type automatic traveling carriage configured from an iron plate floor provided with a belt-like narrow opening which defines a travel route of the magnetic guide-type automatic traveling carriage; a substrate made of non-magnetic material having a concave groove in the top surface side inserted and fixed into the narrow opening of the iron plate floor; and a magnetic guide body inserted into the concave groove of the substrate.

Patent Document 1: Japanese Unexamined Patent Application, Publication No. H08-044426

Patent Document 2: Japanese Unexamined Patent Application, Publication No. H11-119828

SUMMARY OF THE INVENTION

In the line trace technology of a carrier vehicle using magnetism, it is necessary to prevent misdetection of magnetism of the carrier vehicle. In this regard, Patent Document 1 prevents misdetection at a branching location using a belt-like magnetic body for which the magnetic flux density differs. For example, a discrimination method according to the difference in magnetism is disclosed in paragraph 0033 of Patent Document 1 as one example thereof. In addition, Patent Document 2 describes the problem in that the detection accuracy of a magnetism detection sensor declines in the case of adhering magnetic tape or the like to the groove of an iron plate floor, and in order to solve this problem, configures a magnetic guide body mounting structure by a substrate made of the aforementioned non-magnetic material and the magnetic guide body fitted into a concave groove of the substrate.

However, in either technology, even if it were possible to prevent misdetection at a location where one magnetized guidepath branches, it has been difficult to prevent misdetection at a location where multiple guidepaths intersect.

The present invention has been made taking account of the above-mentioned problem, and has an object of providing a guidepath for a carrier vehicle which can effectively prevent misdetection at an intersecting location.

A guidepath for a carrier vehicle (for example, the guidepath 1 described later) according to a first aspect of the present invention is disposed on a floor surface (for example, the floor surface F described later) which guides a carrier vehicle (for example, the carrier vehicle 10 described later) having a first magnetism sensor (for example, the guide sensor 13 described later) which detects a first magnetism (for example, S pole described later), which is one magnetism among S pole and N pole; and a second magnetism sensor (for example, the marker sensor 14 described later) which is disposed at a position distanced in a width direction relative to the first magnetism sensor, and detects a second magnetism (for example, N pole described later) which is the other magnetism among S pole and N pole; in which the guidepath includes: a first path magnetic tape (for example, the magnet guide tape 2 described later) which carries a first magnetism, and by being arranged on the floor surface so as to extend in a first direction (for example, the first direction D1 described later), guides the carrier vehicle in the first direction by way of the first magnetism; a second path magnetic tape (for example, the magnet guide tape 3 described later) which carries the first magnetism, and by being disposed on the floor surface so as to extend in a second direction (for example, the second direction D2 described later) which intersects with the first direction, guides the carrier vehicle in the second direction by way of the first magnetism; and a suppression tape (for example the magnetic body tape 4 described later) which is disposed at a position on a side of the second path magnetic tape, over which the second magnetism sensor passes upon the vehicle carrier being guided by the first path magnetic tape.

According to the present invention, by the magnetism occurring from the back side of the second path magnetic tape short circuiting to the magnetism of the top side by passing through the restrain tape, it is possible to suppress diamagnetism occurring at a side of the second path magnetic tape, which causes misdetection. Consequently, it is possible to prevent misdetection at a location where the guidepaths intersect.

According to a second aspect of the present invention, it is preferable for the suppression tape to have a predetermined length along the second path magnetic tape, and permit deviation in position when the second magnetism sensor passes thereover.

According to the present invention, it is possible to effectively prevent misdetection at an intersecting location, even in a case of deviation in the width direction occurring at a position of the second magnetism sensor, upon the carrier vehicle being guided by the first path magnetic tape.

According to a third aspect of the present invention, it is preferable for the first magnetism sensor and the second magnetism sensor to have substantially the same height of a detection surface.

According to the present invention, it is possible to effectively prevent misdetection at an intersecting location, while being a simple configuration.

According to a fourth aspect of the present invention, it is preferable for the suppression tape to include a magnetic body.

According to the present invention, it is possible to effectively prevent misdetection at an intersecting location, while being a simple configuration.

According to the present invention, it is possible to effectively prevent misdetection at an intersecting point of a guidepath.

BRIEF DESCRIPTION OF THE DRAWINGS

FIG. 3 is a top schematic drawing showing a carrier vehicle;

DETAILED DESCRIPTION OF THE INVENTION

Figure 1:
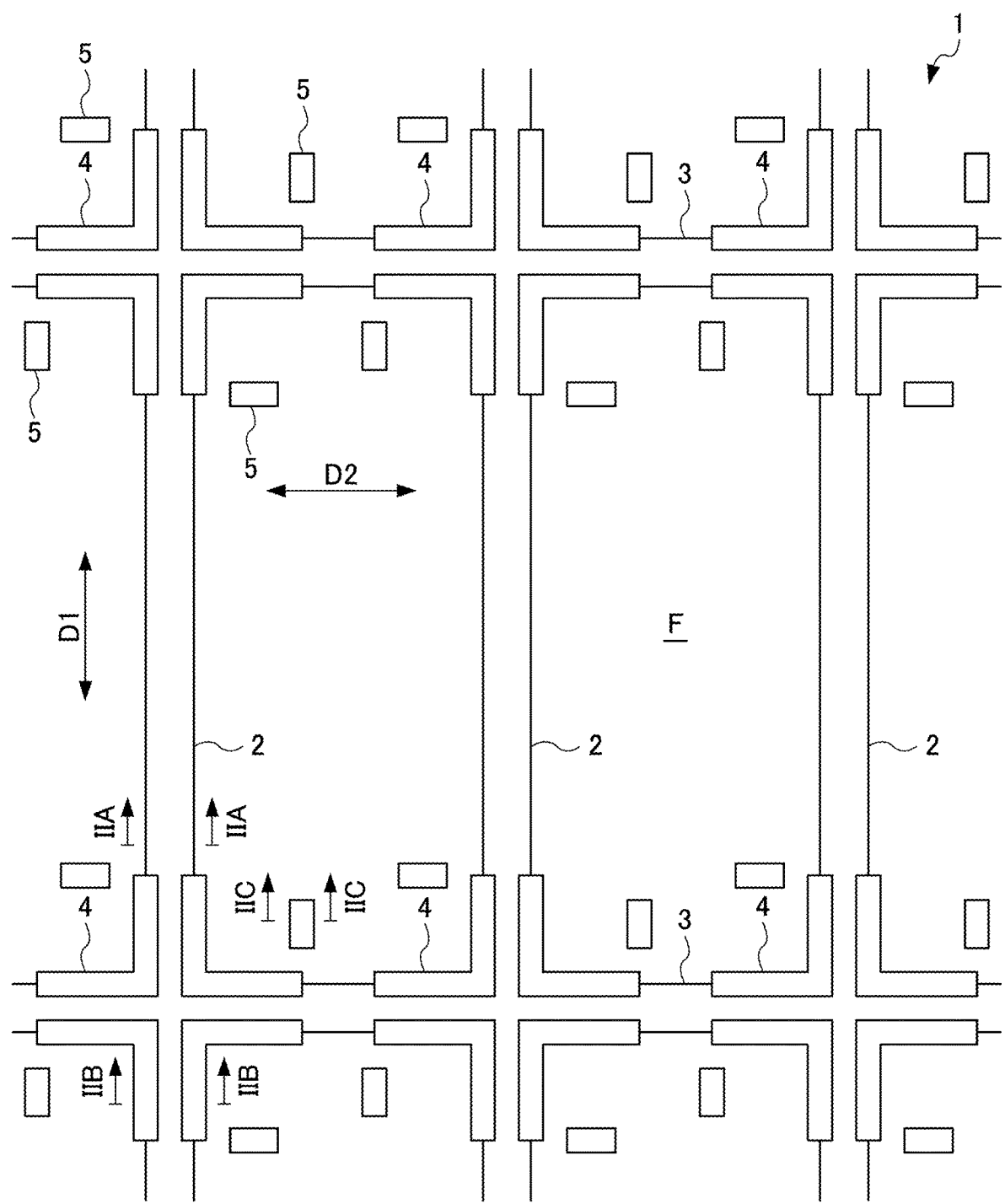
FIG. 1 is a top schematic drawing showing a guidepath for a carrier vehicle according to an embodiment of the present invention.

Hereinafter, an embodiment of the present invention will be explained in detail while referencing the drawings. First, the configuration of a guidepath 1 of a carrier vehicle 10 will be explained using FIGS. 1 and 2. FIG. 1 is a top schematic drawing showing the guidepath 1 of the carrier vehicle 10 according to an embodiment of the present invention.

As shown in FIG. 1, the guidepath 1 of the carrier vehicle 10 (refer to FIGS. 3 and 4) according to the present invention is arranged on a floor surface F, and guides the carrier vehicle 10 described later (refer to FIGS. 3 and 4). More specifically, the guidepath 1 includes a plurality of magnet guide tapes 2, 3, a plurality of magnetic body tapes 4, and a magnet marker 5.

Figure 2A:
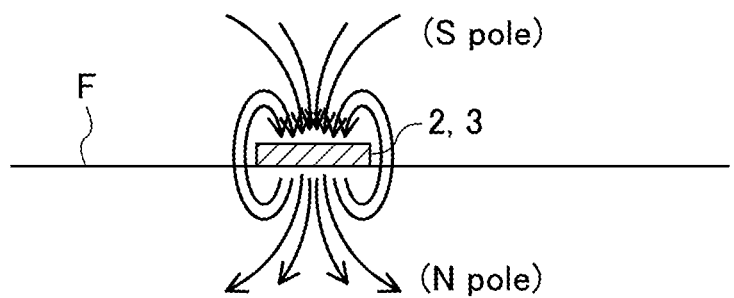
FIG. 2A is a longitudinal section of a guidepath seen along the arrow IIA-IIA direction of FIG. 1.
Figure 2B:
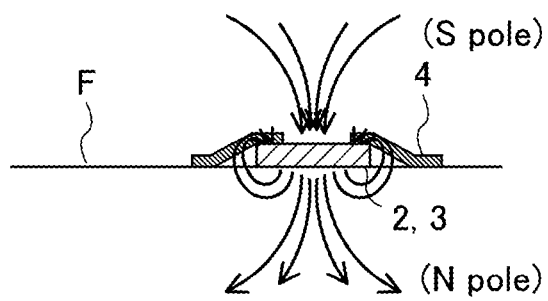
FIG. 2B is a longitudinal section of a guidepath seen along the arrow IIB-IIB direction of FIG. 1.
Figure 2C:
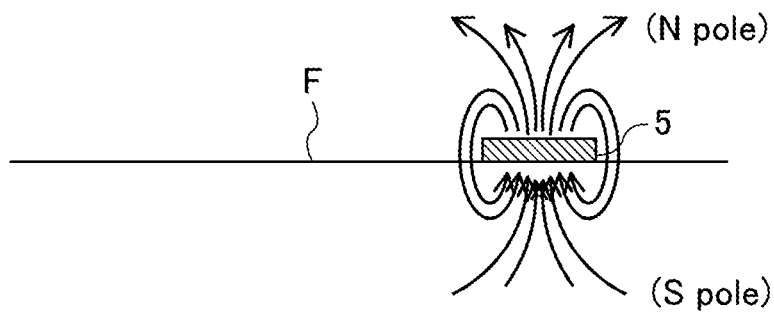
FIG. 2C is a longitudinal section of a guidepath seen along the arrow IIC-IIC direction of FIG. 1.

FIG. 2A is a longitudinal section of the guidepath 1 seen along the arrow IIA-IIA direction in FIG. 1. FIG. 2B is a longitudinal section of the guidepath 1 seen along the arrow IIB-IIB direction in FIG. 1. FIG. 2C is a longitudinal section of the guidepath 1 seen along the arrow IIC-IIC direction in FIG. 1.

The plurality of magnet guide tapes (first path magnetic tape) 2 is arranged on the floor surface F in parallel to each other so that the top surface thereof carries an S pole (first magnetism), which is one magnetism among S pole and N pole, and extends in a first direction D1. As shown in FIG. 2A, this plurality of magnetic guide tapes 2 guides the carrier vehicle 10 (refer to FIGS. 3 and 4) in the first direction D1 by the S pole carried on the top surface thereof.

The plurality of magnet guide tapes (second path magnetic tape) 3 is arranged on the floor surface F in parallel to each other so that the top surface thereof carries an S pole (first magnetism), which is one magnetism among S pole and N pole, and extends in a second direction D2, which intersects with the first direction D1 at a substantially right angle. As shown in FIG. 2A, this plurality of magnet guide tapes 3 guides the carrier vehicle 10 (refer to FIGS. 2A to 2C and FIG. 3) in the second direction D2 by way of the S pole carried on the top surface thereof.

The magnet guide tapes 2, 3 are arranged on the floor surface F in a grid shape at substantially right angles from each other (refer to FIG. 1). The carrier vehicle 10 (refer to FIGS. 3 and 4) is guided by the magnet guide tapes 2, 3.

The plurality of magnetic body tapes (suppression tapes) 4 are tapes including a magnetic body (for example, iron tape). This plurality of magnetic body tapes 4 is arranged at both sides (border) of the magnet guide tapes 2, 3 at locations at which the magnet guide tapes 2, 3 intersect each other. The magnetic body tapes (suppression tapes) 4 of the present embodiment are arranged in an L shape running along a corner.

The plurality of magnetic body tapes 4 is thereby arranged at the sides of the magnet guide tapes 2, 3, and at positions at which a marker sensor 14 (refer to FIGS. 3 and 4) passes over upon the carrier vehicle 10 (refer to FIGS. 3 and 4) being guided by the magnet guide tapes 2, 3. As shown in FIG. 2B, such a plurality of magnetic body tapes 4 is the other magnetism among S pole and N pole, and suppresses the N pole (second magnetism) from going around the top surface from the bottom surface of the magnet guide tapes 2, 3.

In addition, the plurality of magnetic body tapes 4 has a predetermined length along the magnet guide tapes 2, 3, and permits a shift in position when the marker sensor 14 (refer to FIGS. 3 and 4) passes above. The predetermined length is a length including tolerance which can prevent misdetection of the marker sensor 14, even in a case of the traveling direction of the carrier vehicle 10 being oblique relative to the extending direction of the magnet guide tapes 2, 3.

A plurality of magnet markers 5 is respectively arranged at positions at which the top surface thereof carries the N pole, which is the other magnetism among S pole and N pole, and distanced relative to the magnet guide tapes 2, 3, and at positions at which the marker sensor 14 (refer to FIGS. 3 and 4) is above upon the carrier vehicle 10 (refer to FIGS. 3 and 4) reaching a location at which the magnet guide tapes 2, 3 intersect. This plurality of magnet markers 5 is detected at the market sensor 14 (refer to FIGS. 3 and 4) of the carrier vehicle 10 (refer to FIGS. 3 and 4) having reached a location at which the magnet guide tapes 2, 3, by way of the N pole carried on the top surface of the magnet marker 5.

Next, the configuration of the carrier vehicle 10 will be explained using FIGS. 3 and 4. FIG. 3 is a top schematic drawing showing the carrier vehicle 10. FIG. 4 is an exterior perspective view showing a rotary drive unit 12 of the carrier vehicle 10. In FIG. 4, illustration of configurations other than the rotary drive unit 12 is omitted.

Figure 4:
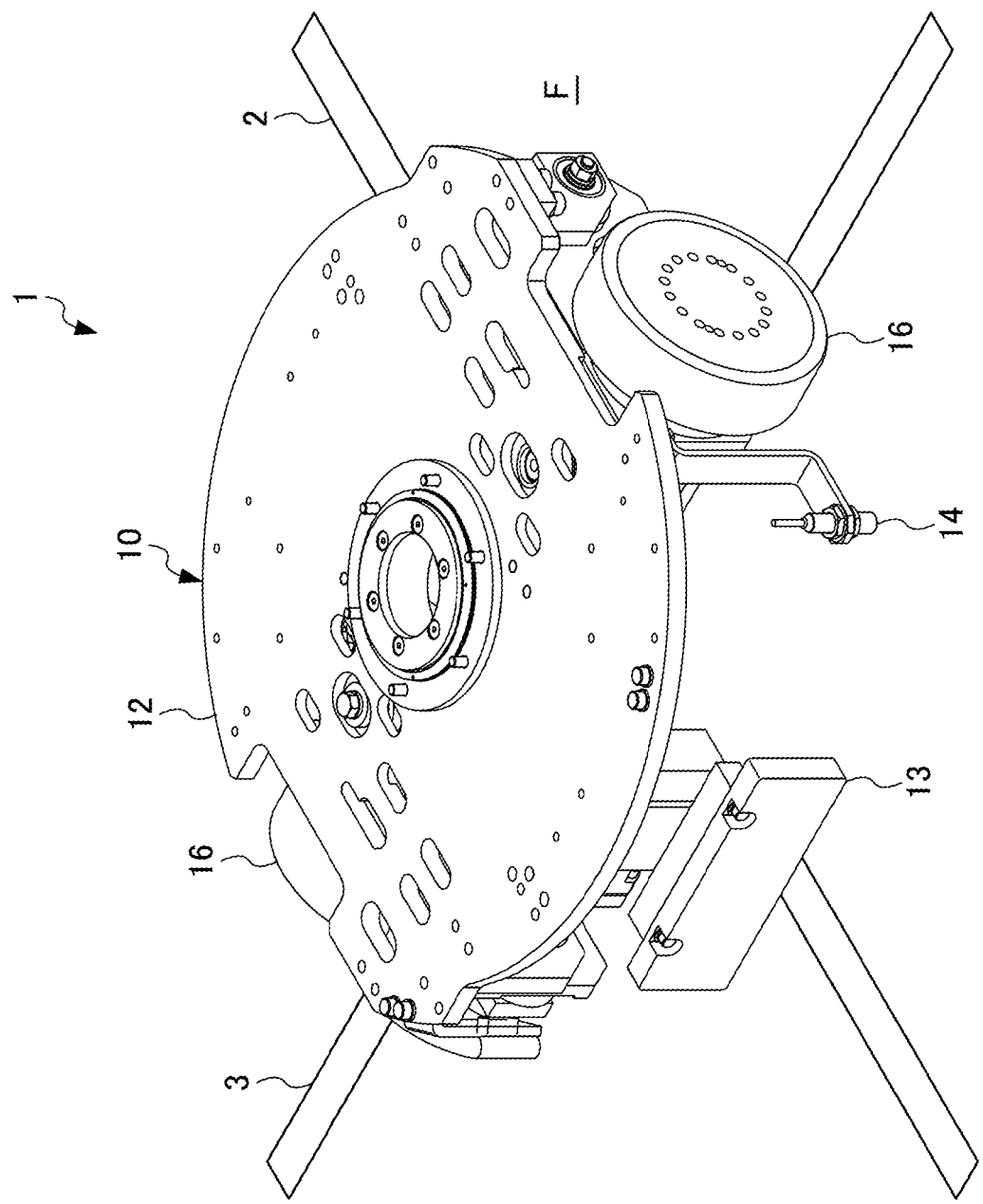
FIG. 4 is an exterior perspective view showing a rotary drive unit of a carrier vehicle.

The carrier vehicle 10 shown in FIGS. 3 and 4 is a low-floor type AGV (Automatic Guided Vehicle) which crawls under a conveyance object having a space thereunder, and raises this conveyance object and conveys to a predetermined position. More specifically, the carrier vehicle 10 includes a vehicle body 11, rotary drive unit 12, pair of guide sensors 13, and pair of marker sensors 14.

The vehicle body 11 is formed in a flat box shape, and is arranged so that the longitudinal direction thereof follows the first direction D1 (or second direction D2), and the short direction thereof follows the second direction D2 (or first direction D1). This vehicle body 11 has casters 15 serving as idler wheels at each of the right-front part, right-rear part, left-front part and left-rear part thereof. The casters 15 make movement of the carrier vehicle 10 in the first direction D1 and second direction D2 possible.

The vehicle body 11 has a control box (not illustrated), various types of electrical components (not illustrated), a control motor (not illustrated) and transfer mechanism (not illustrated) inside thereof. The control box (not illustrated) is a computer including a substrate, etc., and performs various controls on the carrier vehicle 10. The electrical components (not illustrated) consist of a control battery, capacitors, motor driver, harness, etc., and perform input/output of signals relative to the control box (not illustrated), power supply to the drive motor (not illustrated), etc.

The rotary drive unit 12 is a disk member arranged at the center below the vehicle body 11, and rotatably supported by the vehicle body 11. More specifically, the rotary drive unit 12 has a pair of drive tires 16 which drive independently from each other at the left and right thereof. The pair of drive tires 16 causes the carrier vehicle 10 to travel by rotating at constant velocity in the same direction as each other.

In addition, the pair of drive tires 16 causes the rotary drive unit 12 to rotate on the spot, by rotating at constant velocity in opposite directions to each other. The rotary drive unit 12 converts the traveling direction of the carrier vehicle 10 by rotating on the spot. Upon rotating on the spot, this rotary drive unit 12 is able to not change the absolute position of the vehicle body 11, by relatively rotating in relation to the vehicle body 11. The carrier vehicle 10 thereby becomes able to change the traveling direction without changing the orientation.

The pair of guide sensors (first magnetism sensor) 13 is respectively provided at the forward lower part and rearward lower part of the rotation drive part 12, and a detection surface thereof (not illustrated) faces downwards. This pair of guide sensors 13 detects the S pole carried on the top surface of the magnet guide tapes 2, 3. During travel of the carrier vehicle 10, in the case of defining the traveling direction thereof as forward, the guide sensor 13 provided at the rearward lower part of the rotary drive unit 12 functions, while the guide sensor 13 provided at the forward lower part of the rotary drive unit 12 stops functioning.

The pair of marker sensors (second magnetism sensor) 14 is respectively provided to a front-left lower part and rear-right lower part of the rotary drive unit 12 so as to be arranged at positions distanced in the width direction (direction orthogonal to traveling direction) relative to the guide sensor 13, and the detection surface thereof (not illustrated) faces downwards. In other words, the pair of marker sensors 14 has an interval (distance) from the guide sensor 13 in the lateral direction when viewing the carrier vehicle 10 in the advancing direction.

This pair of marker sensors 14 detects the N pole carried on the top surface of the magnet marker 5. During travel of the carrier vehicle 10, in the case of defining the traveling direction thereof as forward, the marker sensor 14 provided at the rear-right lower part of the rotary drive unit 12 functions, while the marker sensor 14 provided on the front-left lower part of the rotary drive unit 12 stops functioning. For the detection surface (not illustrated) of the pair of marker sensors 14, the height thereof is substantially equal to the detection surface (not illustrated) of the pair of guide sensors 13.

Figure 5:
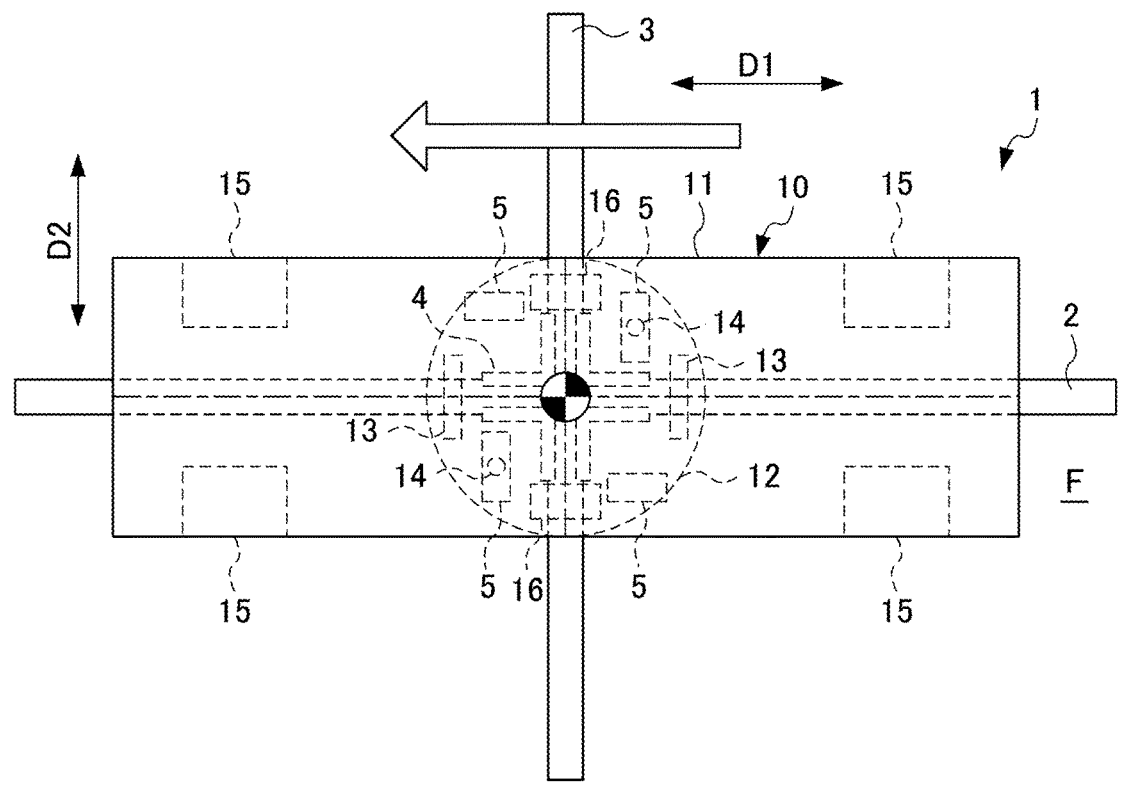
FIG. 5 is a top schematic drawing showing a carrier vehicle guided in a first direction.
Figure 6:
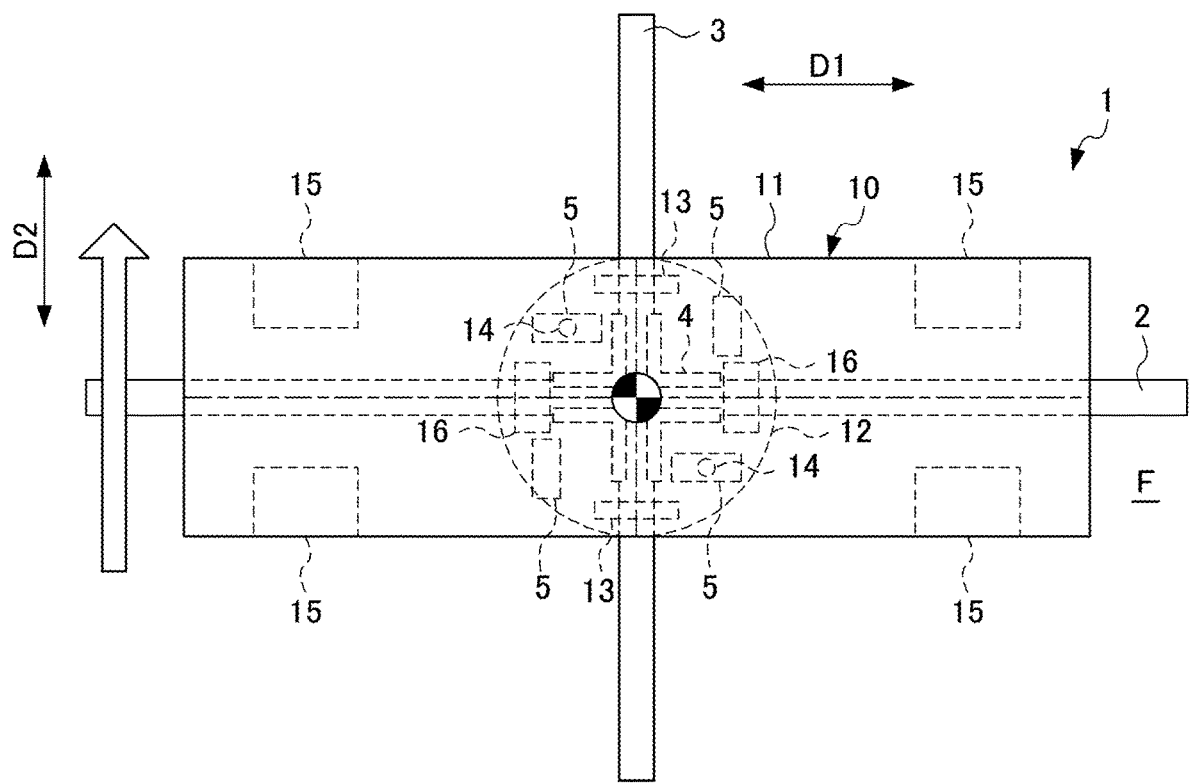
FIG. 6 is a top schematic drawing showing a carrier vehicle guided in a second direction.

Next, movement of the carrier vehicle 10 guided by the guidepath 1 will be explained using FIGS. 5 and 6. FIG. 5 is a top schematic drawing showing the carrier vehicle 10 guided in the first direction D1. FIG. 6 is a top schematic drawing showing the carrier vehicle 10 guided in the second direction D2.

As shown in FIG. 5, in the case of the magnet guide tape 2 guiding the carrier vehicle 10 in the first direction D1 by the S pole carried on the top surface thereof, the carrier vehicle 10 travels towards the first direction D1, while the guide sensor 13 provided at a rearward lower part of the rotary drive unit 12 detects the S pole carried on the top surface of the magnet guide tape 2.

Upon reaching the location at which the magnet guide tapes 2, 3 intersect, the carrier vehicle 10 traveling in the first direction D1 grasps the matter of having reached the location at which the magnet guide tapes 2, 3 intersect, by the marker sensor 14 provided at the rear-right lower part of the rotary drive unit 12 detecting the S pole carried on the top surface of the magnet marker 5.

The carrier vehicle 10 having reached the location at which the magnet guide tapes 2, 3 intersect can switch the traveling direction to the second direction D2, by stopping, and causing the rotary drive unit 12 to rotate on the spot.

As shown in FIG. 6, in the case of the magnet guide tape 3 guiding the carrier vehicle 10 in the second direction D2 by way of the S pole carried on the top surface thereof, the carrier vehicle 10 travels in the second direction D2, while the guide sensor 13 provided at the rearward lower part of the rotary drive unit 12 detects the S pole carried on the top surface of the magnet guide tape 3.

Upon reaching a location at which the magnet guide tapes 2, 3 intersect, the carrier vehicle 10 traveling towards the second direction D2 grasps the matter of having reached the location at which the magnet guide tapes 2, 3 intersect, by the marker sensor 14 provided at the rear-right lower part of the rotary drive unit 12 detecting the S pole carried on the top surface of the magnet marker 5.

The carrier vehicle 10 having reached a location at which the magnet guide tapes 2, 3 intersect can switch the traveling direction to the first direction D1, by stopping, and causing the rotary drive unit 12 to rotate on the spot.

In the case of either of FIGS. 5 and 6, since a plurality of magnetic body tapes 4 is arranged at locations at which the magnet guide tapes 2, 3 intersect (refer to FIG. 1), the N pole (second magnetism) is suppressed from going around to the top surface from the lower surface of the magnet guide tapes 2, 3, and misdetection of the marker sensor 14 which tends to occur upon the carrier vehicle 10 passing through the location at which the magnet guide tapes 2, 3 intersect is prevented.

According to the guidepath 1 of the carrier vehicle 10 related to the present embodiment, the following effects are exerted. First, according to the present embodiment, by the N pole (magnetism of back side) occurring from the back side of the magnet guide tape 3 short circuiting to the S pole (magnetism of top side) of the top side by passing through the magnetic body tape 4, it is possible to suppress diamagnetism occurring at a side of the magnet guide tape 3, which causes misdetection. Consequently, it is possible to prevent misdetection at a location where the magnet guide tapes 2, 3 intersect.

In addition, according to the present embodiment, since the magnetic body tape 4 has a predetermined length along the magnet guide tape 3 (length of maximum deflection amount+α of carrier vehicle 10), upon the carrier vehicle 10 being guided by the magnet guide tape 2, even in a case of the advancing direction of the carrier vehicle 10 being oblique relative to the extending direction of the magnet guide tapes 2, 3, it is possible to reliably prevent misdetection at a location where the magnet guide tapes 2, 3 intersect.

In addition, according to the present embodiment, since the heights of the detection surfaces of the guide sensor 13 and marker sensor 14 are substantially the same, it is possible to reliably prevent misdetection at a location where the magnet guide tapes 2, 3 intersect, while being a simple configuration. In addition, since it is possible to lower the positions of the guide sensor 13 and marker sensor 14 in the carrier vehicle 10, a large space to place the conveyed objects above can be ensured.

In addition, according to the present embodiment, since the magnetic body tape 4 including a magnetic body is used as the suppression tape, it is possible to reliably prevent misdetection at a location where the magnet guide tapes 2, 3 intersect, while being a simple configuration.

It should be noted that the present invention is not to be limited to the above-mentioned embodiment, and that modifications, improvements, etc. within a scope which can achieve the object of the present invention are also encompassed by the present invention.

In the present embodiment, the magnet guide tapes 2, 3 are arranged so as to intersect each other at a substantially right angle; however, the present invention is not technology in which the angle at which the magnet guide tapes 2, 3 intersect is limited. In addition, the S pole and N pole may be the reverse relationship to the above-mentioned embodiment.

It should be noted that, although the magnet guide tapes 2, 3 use permanent magnets in the present embodiment, it is not limited to this configuration. It is also possible to establish a configuration which generates a magnetic field by current flowing through the first path magnetic tape and second path magnetic tape. In other words, it may be a configuration in which the magnetisms of the first path magnetic tape and second path magnetic tape carry magnetism temporarily.

In addition, in the present embodiment, although the magnetic body tape (suppression tape) of the present embodiment is arranged in an L shape running along the corner, it is not limited to this configuration. It may be an arrangement separated and a gap being provided.

EXPLANATION OF REFERENCE NUMERALS

1 guidepath
2 magnet guide tape (first path magnetic tape)
3 magnet guide tape (second path magnetic tape)
4 magnetic body tape (suppression tape)
5 magnet marker
10 carrier vehicle
11 vehicle body
12 rotary drive unit
13 guide sensor (first magnetism sensor)
14 marker sensor (second magnetism sensor)
15 caster
16 drive tire
F floor surface
D1 first direction
D2 second direction

What is claimed is:

1. A guidepath for a carrier vehicle which is disposed on a floor surface which guides a carrier vehicle having a first magnetism sensor which detects a first magnetism, which is one magnetism among S pole and N pole; and
   a second magnetism sensor which is disposed at a position distanced in a width direction relative to the first magnetism sensor, and detects a second magnetism which is the other magnetism among S pole and N pole, the guidepath comprising:
   a first path magnetic tape which carries a first magnetism, and by being arranged on the floor surface so as to extend in a first direction, guides the carrier vehicle in the first direction by way of the first magnetism;
   a second path magnetic tape which carries the first magnetism, and by being disposed on the floor surface so as to extend in a second direction which intersects with the first direction, guides the carrier vehicle in the second direction by way of the first magnetism; and
   a suppression tape which is disposed at a position on a side of the second path magnetic tape, over which the second magnetism sensor passes upon the vehicle carrier being guided by the first path magnetic tape.

2. The guidepath for a carrier vehicle according to claim 1, wherein the suppression tape has a predetermined length along the second path magnetic tape, and permits deviation in position when the second magnetism sensor passes thereover.

3. The guidepath for a carrier vehicle according to claim 1, wherein the first magnetism sensor and the second magnetism sensor have substantially the same height of a detection surface.

4. The guidepath for a carrier vehicle according to claim 2, wherein the first magnetism sensor and the second magnetism sensor have substantially the same height of a detection surface.

5. The guidepath for a carrier vehicle according to claim 1, wherein the suppression tape includes a magnetic body.

6. The guidepath for a carrier vehicle according to claim 2, wherein the suppression tape includes a magnetic body.

7. The guidepath for a carrier vehicle according to claim 3, wherein the suppression tape includes a magnetic body.

8. The guidepath for a carrier vehicle according to claim 4, wherein the suppression tape includes a magnetic body.

* * * * *